(12) United States Patent
Kramer (10) Patent No.: US 10,302,114 B2
(45) Date of Patent: May 28, 2019

(54) ADJUSTABLE BRACKET

(71) Applicant: Peter Kramer, Washington, VA (US)

(72) Inventor: Peter Kramer, Washington, VA (US)

( * ) Notice: Subject to any disclaimer, the term of this patent is extended or adjusted under 35 U.S.C. 154(b) by 0 days.

(21) Appl. No.: 15/939,608

(22) Filed: Mar. 29, 2018

(65) Prior Publication Data

US 2018/0306223 A1 Oct. 25, 2018

Related U.S. Application Data

(60) Provisional application No. 62/489,166, filed on Apr. 24, 2017.

(51) Int. Cl.
| | |
|---|---|
| *F16M 13/00* | (2006.01) |
| *F16B 12/02* | (2006.01) |
| *F16B 12/46* | (2006.01) |
| *F16B 12/50* | (2006.01) |
| *A47B 13/02* | (2006.01) |
| *F16B 12/48* | (2006.01) |
| *F16B 12/52* | (2006.01) |
| *F16B 5/02* | (2006.01) |

(52) U.S. Cl.
CPC ........... *F16B 12/02* (2013.01); *A47B 13/021* (2013.01); *F16B 12/46* (2013.01); *F16B 12/48* (2013.01); *F16B 12/50* (2013.01); *F16B 12/52* (2013.01); *F16B 5/02* (2013.01)

(58) Field of Classification Search
CPC ........ E04G 25/06; E04G 25/065; F16M 11/28
USPC ....... 248/354.3, 501, 502, 188.1, 188.4, 188
See application file for complete search history.

(56) References Cited

U.S. PATENT DOCUMENTS

| | | | | |
|---|---|---|---|---|
| 2,304,481 | A | 12/1942 | Shannon | |
| 3,018,526 | A | 1/1962 | Riebel | |
| 5,292,095 | A * | 3/1994 | Cattaneo | A47B 91/028 248/188.4 |
| 6,925,945 | B2 * | 8/2005 | Babick | A47B 13/021 108/156 |
| 7,111,564 | B2 * | 9/2006 | Chang | A47B 13/06 108/155 |
| 9,206,939 | B2 * | 12/2015 | Brandstrom | F16B 12/44 |
| 2008/0029677 | A1 * | 2/2008 | Lee | F16B 12/52 248/501 |

* cited by examiner

*Primary Examiner* — Steven M Marsh
(74) *Attorney, Agent, or Firm* — Clinical Programs—IPC American University Washington College of Law (57) ABSTRACT

An apparatus may comprise a plate, an arm, and an arm fastener. The plate comprises: a plate edge, an arm mounting region, and surface mounting region(s). The surface mounting region(s) is configured to affix the plate to a surface with the plate edge facing a surface terminus of the surface. The arm comprises a leg mounting region. The arm fastener is configured to adjustably hold the arm to the arm mounting region with the leg mounting region extending beyond the plate edge.

19 Claims, 10 Drawing Sheets

ADJUSTABLE BRACKET

CROSS-REFERENCE TO RELATED APPLICATIONS

This application claims the benefit of U.S. Provisional Application No. 62/489,166 filed Apr. 24, 2017, which is hereby incorporated by reference in its entirety.

BRIEF DESCRIPTION OF THE SEVERAL VIEWS OF THE DRAWINGS

Non-limiting examples of embodiments of the disclosure are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION OF EMBODIMENTS

An embodiment of the present disclosure may extend a support outside at least part of and/or all of, for example, a table surface. An example of a support may comprise a leg. An embodiment of the present disclosure may extend a leg or support outside the internal angle of a joint using a mechanical brace. Details and example of various embodiments are set forth in the following description and in the figures to provide an understanding of such embodiments. Additional embodiments and/or depictions may include elements of other embodiments. One skilled in the art, however, will understand that the claims are not limited to the present embodiments, and that additional embodiments may be practiced within the scope of the claims and this disclosure.

Some table supports may typically be confined to the borders of a table surface. Such a structure may lead to over-crowding under the table surface and/or a reduction in seating capacity. An embodiment of the present disclosures may increase usable table surface area and may increase below table surface leg room. An embodiment of the present disclosure may permit supports to extend outside a tables border, lessening crowding and maximizing seating capacity. An embodiment of the present disclosure may allow the support to be a decorative element. Another embodiment of the present disclosure may allow a user to adjust the position of the support or change the support.

Figure 1:
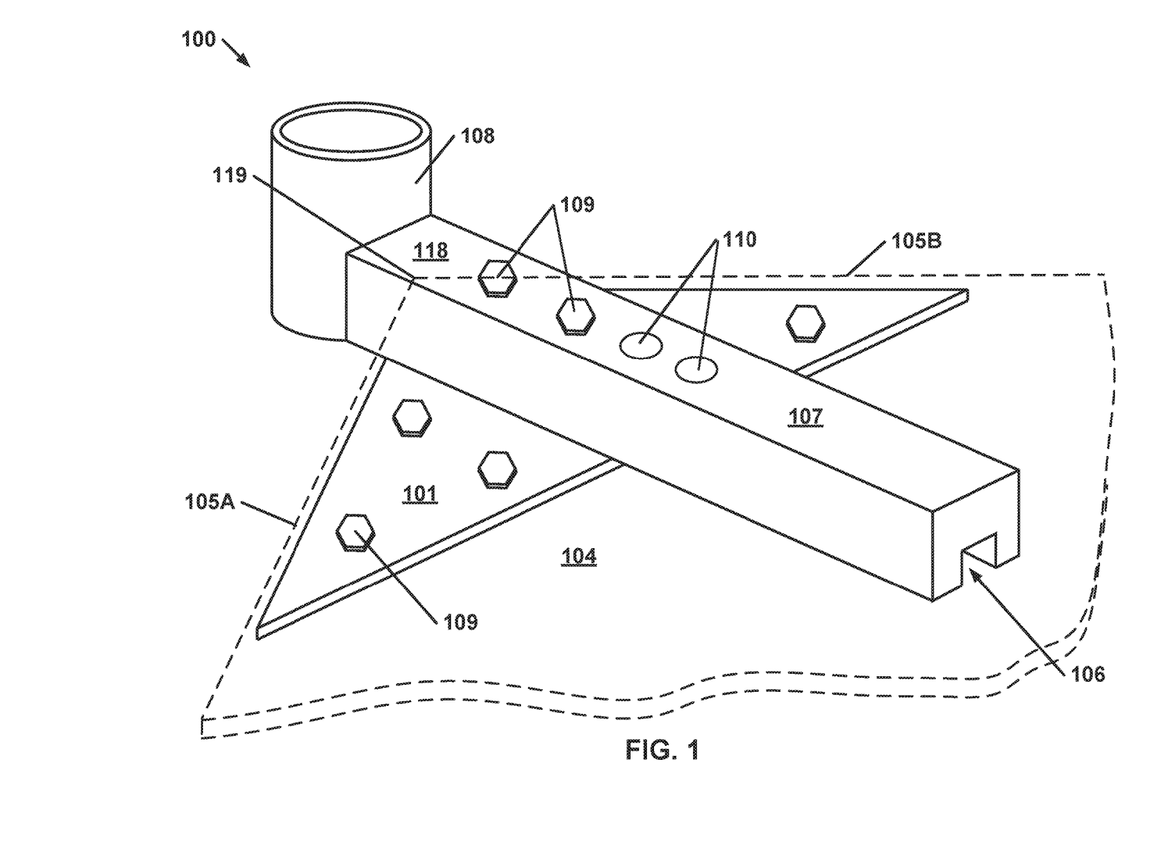
FIG. 1 is an illustration of an example adjustable bracket as per an aspect of an embodiment of the present disclosure.
Figure 7:
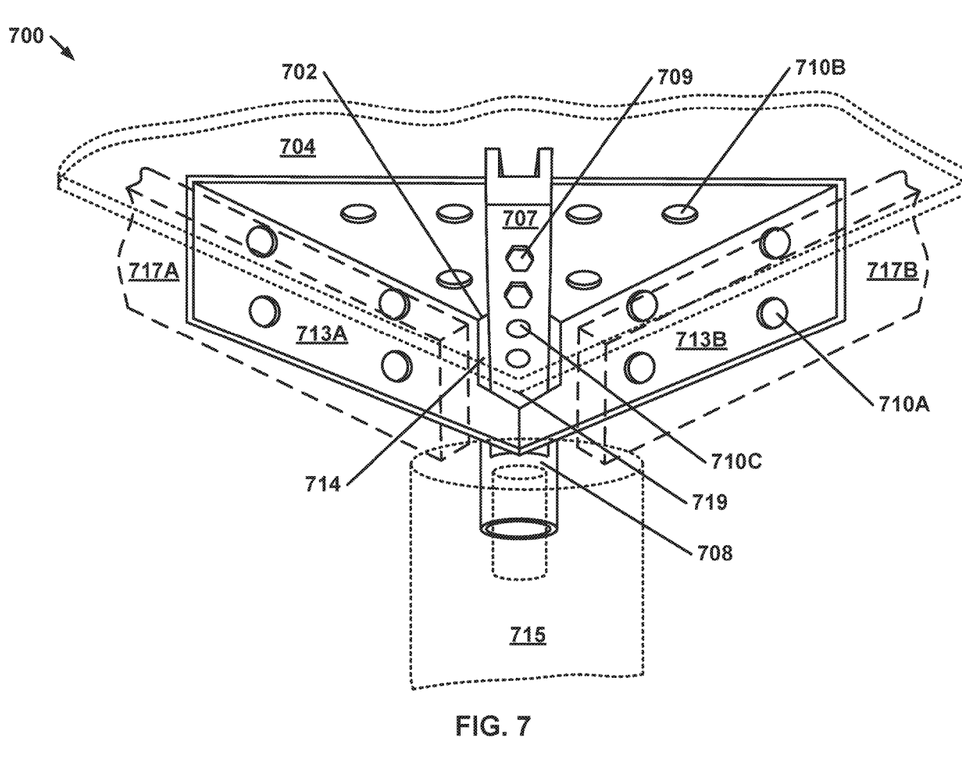
FIG. 7 illustrates an example bracket as per an aspect of an embodiment of the present disclosure.

FIG. 1 illustrates an example embodiment of an adjustable bracket 100. As illustrated, embodiment 100 is mounted to a surface 104. A leg mounting region 108 may be configured to extend past a surface terminus 105A and/or 105B. The surface terminus 105A and/or 105B may be demarcated as an edge or an end formed by the conjunction between the surface 104 and a different material or element. For example, the surface terminus 105A and/or 105B may comprise the edge of surface 104, as depicted in FIG. 1. According to an embodiment, the edge of surface 104 may be created by contact between a surface (e.g. perpendicular supports 713A and 713B) and an apron (e.g. 717A and 717B) as depicted in FIG. 7.

An arm 107 may be attached to a plate 101 employing an arm mounting region 106. In this illustrated embodiment, the arm 107 may extend beyond an edge of surface 104, such as for example, a corner 119 of the surface 104. In alternative embodiments, the arm 107 may extend beyond another edge of the surface 104, such as, for example a surface terminus 105A and/or 105B.

A leg mounting region 108 may be attached to an extended end 118 of an arm 107. The leg mounting region 108 may be a horizontal or vertical plate, tubular region, rectangular region, trapezoidal region, and/or any combination of the like to accommodate for the shape of the leg (not shown). The leg mounting region 108 may be welded, cast, formed, and/or any combination of the like to the extended end 118 of the arm 107.

A leg (not shown) may be attached to a leg mounting region 108 by force fitting, threading it to fit in the leg mounting region 108, nailing it in place, screwing it in place, and/or any combination of the like.

A Plate 101 may be attached to a surface 104 employing multiple possible mechanisms. For example, voids (not shown) in the plate 101 may be employed to mechanically adhere an embodiment 100 to the surface 104 using fasteners 109. Examples of fasteners comprise screws, nails, hooks, and/or the like. A mechanical adhesion may employ voids 110 to hold the arm 107 against an arm mounting region 106 using fasteners 109. Other locking mechanisms may lock the arm in place. Examples of locking mechanisms include cams, rackets and pinions, gravity induced frictional forces, combinations thereof, and/or the like.

Figure 2:
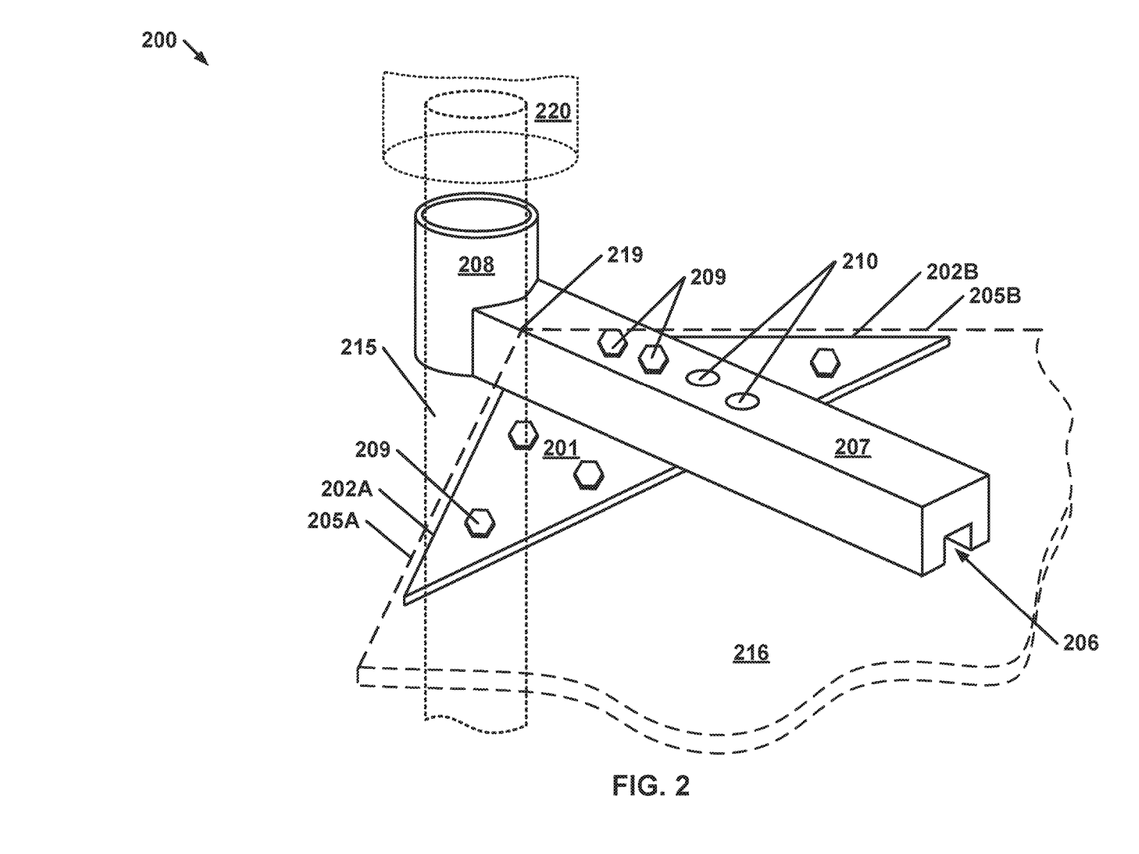
FIG. 2 illustrates an example apparatus supporting a post beyond a table corner as per an aspect of an embodiment of the present disclosure.

FIG. 2 illustrates a bracket 200 mounting a leg 215 to a surface 204 (shown with dashed lines). A plate 201 may be mechanically affixed to the surface 204 via a mechanical adhesion such as, for example, fasteners 209. The plate 201 may support an arm mounting region 206. The arm mounting region 206 may support an arm 207. The Fasteners 209 may penetrate voids 210 in the arm 207 to lock the arm 207 against the arm mounting region 206. If an apron (not shown) or a substantial perpendicular support (not shown) is employed, the arm 207 may extend past a breach (not shown) holding a leg 215 beyond the internal angle of a corner 219, the plate edge 202A and/or 202B, and/or a surface terminus 205A and 205B. The leg 215 may have a cap 220. The bracket 200 may also be employed to support the arm 207 without requiring the support of the apron (not shown). The leg 215 may be mounted to a leg mounting region 208 and may be held in place via a mechanical adhesion.

Figure 3:
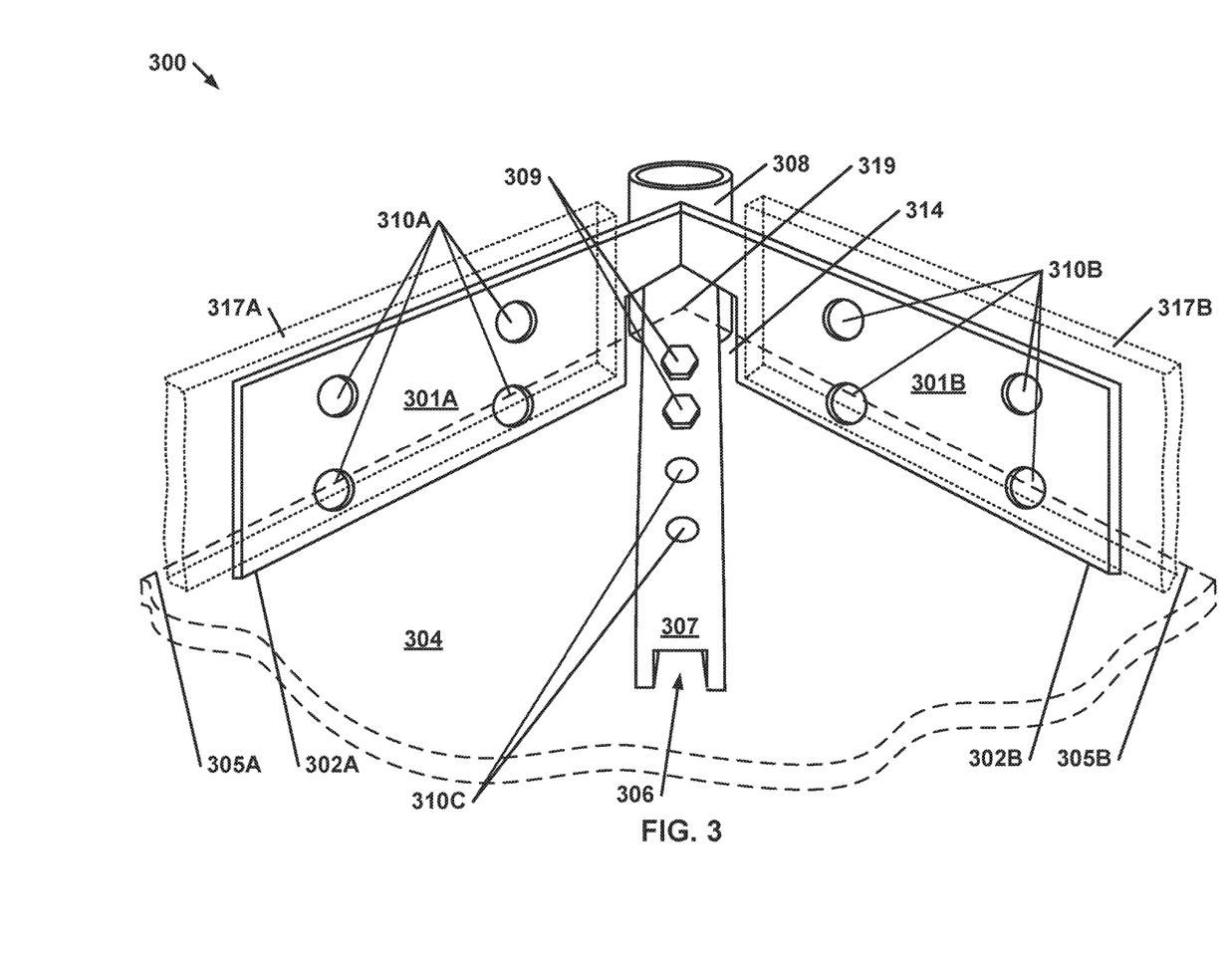
FIG. 3 is an illustration of an example adjustable bracket as per an aspect of an embodiment of the present disclosure.

FIG. 3 illustrates an example embodiment 300 in which plate(s) 301A and 301B are affixed to apron(s) 317A and 317B respectively (shown in dashes). The Apron(s) 317A and 317B, in this illustrative embodiment, may, each or collectively, act as a surface. Voids 310A and 310B may be employed with fasteners (not shown) to affix the plate(s) 301A and 301B to the apron(s) 317A and 317B respectively. In this example, an arm mounting region 306 may be affixed to a table surface 304. An arm 307 may extend past plate edges 302A and 302B and/or surface terminus 305A and 305B via the a breach 314 in the plate(s) 301A and 301B. However, one having ordinary skill the art will understand that an embodiment may be employed to extend a leg, support, post, combination thereof, and/or the like, beyond an internal angle of a corner 319. The corner 319 may be part of, for example, a cabinet, a bench, a shelf, a chair, combinations thereof, and/or the like. A leg mounting region 308 may be at the end of the arm 307 extended beyond the plate edge 302A and/or 302B. Voids 310C in the arm 307 may be employed with fasteners (e.g. 309) to attach the arm 307 to an arm mounting region 306.

Figure 4:
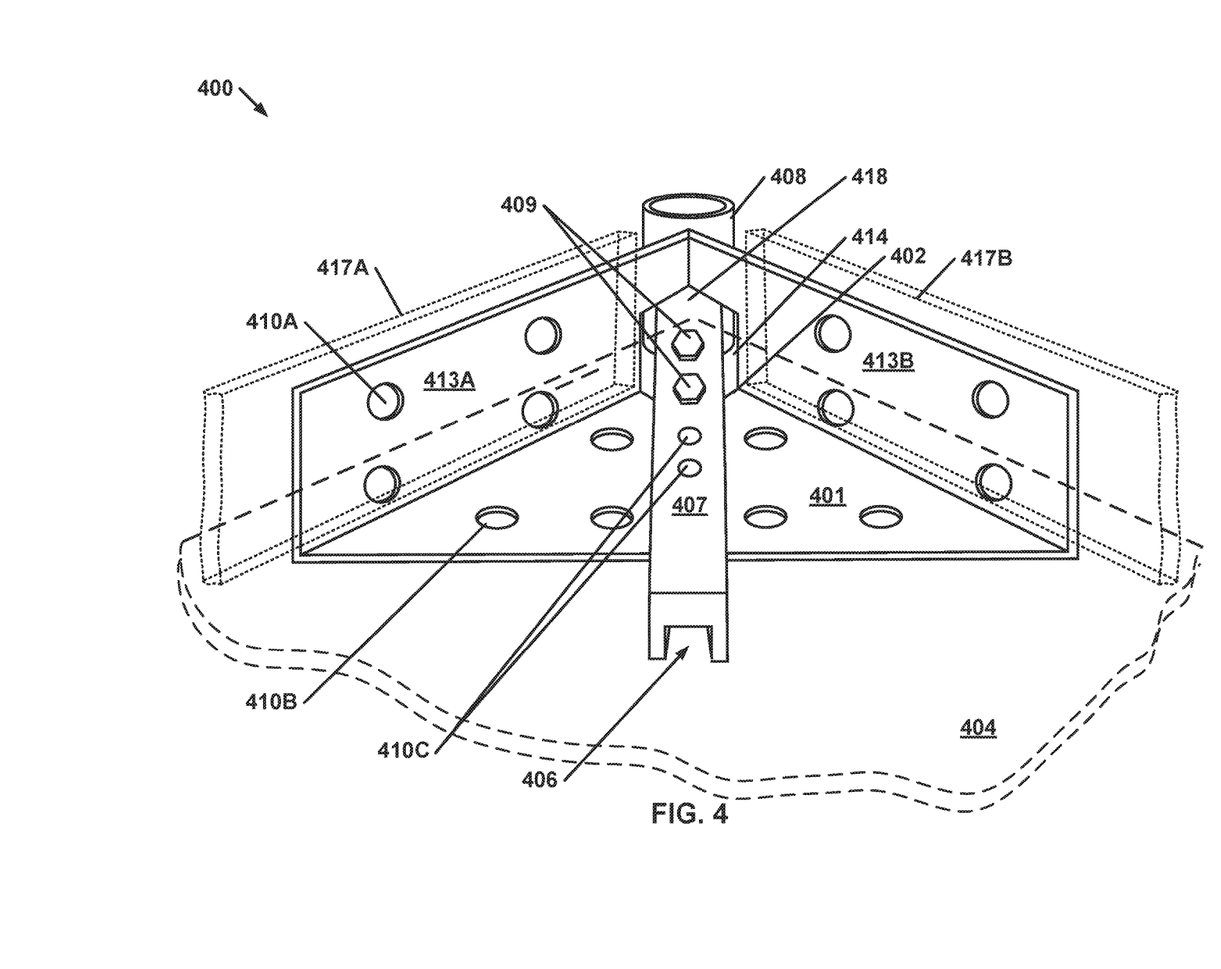
FIG. 4 is an illustration of an example adjustable bracket as per an aspect of an embodiment of the present disclosure.

FIG. 4 illustrates an example embodiment 400 of the present disclosure involving a triangular plate 401 affixed to perpendicular supports 413A and 413B. The triangular plate 401 affixed to the perpendicular supports 413A and 413B may create mechanical support for a corner joint (not shown). Though FIG. 4 depicts a right-angle relation between the plate 401 and the supports 413A and 413B, elements 401, 413A and 413B may include an angle between 1 degree and 179 degrees relative to the plane of the plate 401. A breach 414 in the support 413A and 413B may allow an arm 407 to extend past a plate edge 402 of the plate 401. A leg (not shown) may be mounted on an extended end 418 of the arm 407. This example embodiment may employ, for example, a threaded circular hollow cylinder as a leg mounting region 408. The threaded circular hollow cylinder may comprise a threaded right circular hollow cylinder. The threaded circular hollow cylinder may allow a threaded rod (not shown) to penetrate the leg mounting region 408. The threaded circular hollow cylinder may also allow for the attachment of a leg, post, cap, and/or a substantially vertical support to one or both ends of the leg mounting region 408. However, a person having ordinary skill in the art will recognize that the threaded circular hollow cylinder is not the only way to attach a leg to the leg mounting region 408. The leg mounting region 408 may be a horizontal or vertical plate, tubular region, rectangular region, trapezoidal region, and/or any combination of the like to accommodate for the shape of the leg (not shown). Other mechanical adhesion, for example, screws, bolts, glue, dowels, cables, magnets, pins, combinations thereof, and/or the like may be employed to mechanically adhere a leg to the leg mounting region 408. Similarly, the leg may be welded or fused to the leg mounting region 408. Voids (e.g. 410A, 410B and 410C) may exist in both the plate 401 and the perpendicular supports 413A and/or 413B. According to an embodiment, the void may be employed to adhere the plate 401 to a surface 404 (shown in dashes) and/or the support 413A and/or 413B to an apron 417A and/or 417B (shown in dashes) respectively employing a mechanical adhesion mechanism. The supports 413A and 413B and plate 401 may also be fused to their respective surface. An arm mounting region 406 may affix the arm 407 to the plate 401. In this example, illustrated in FIG. 4, the arm mounting region 406 may comprise, for example, a tongue in a tongue and groove joint. The tongue and groove joint may enable a user to adjust the distance between the leg mounting region 408 and the plate edge 402. However, the arm mounting region 406 is not limited to this one example and may include other joining mechanisms such as: joints, rails, slides, guides, combinations thereof, and/or the like. Once a desired distance is obtained, the arm 407 may be locked into place employing, for example, fasteners 409. Examples of locking mechanism(s) include but are not limited to: mechanical adhesion, rackets and pinions, gravity induced frictional forces, combinations thereof, and/or the like. In this example, illustrated in FIG. 4, the fasteners 409 are depicted as bolts mechanically fastening the arm 407 to the arm mounting region 406.

Figure 5A:
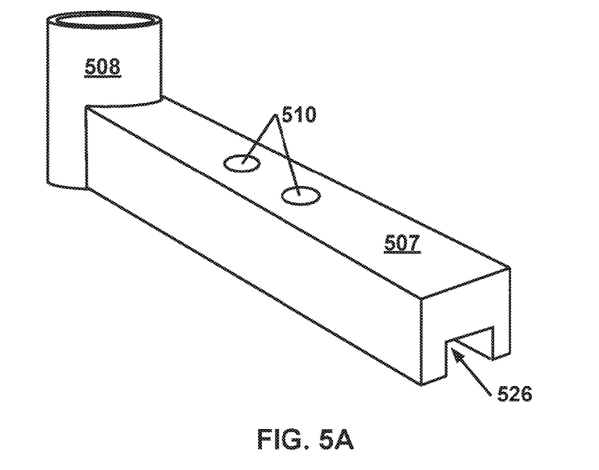
FIG. 5A illustrates an example of an arm with a leg mounting region and a slot as per an aspect of an embodiment of the present disclosure.
Figure 5B:
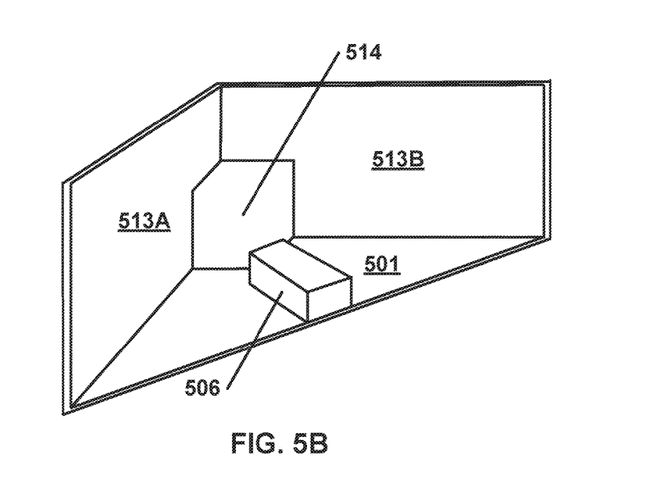
FIG. 5B illustrates an example of a plate with perpendicular supports and an arm mounting region as per an aspect of an embodiment of the present disclosure.

FIG. 5A and FIG. 5B illustrate an expanded view of an arm mounting region, such as the arm mounting region of example FIG. 1. In this example, FIG. 5A shows an example arm 507. FIG. 5B shows a plate 501 without the arm 507. The arm 507 is depicted as having a groove 526 carved into the length of arm 507. The groove 526 may act as negative space which may be employed to guide the arm 507. Another example of an arm 507 may comprise a separate component, such as, for example, a rail and/or a slide, added to the arm as the negative space. Another example of an arm 507 may comprise a positive portion of the guide manufactured from or added to the arm 507. A leg mounting region 508 may be disposed at the end of arm 507. The arm 507 may have a multitude of voids 510 along the arm 507 to enable a fastener (not shown) to pass. An arm mounting region 506 is depicted as a tongue of a tongue and groove slide on the plate 501. The arm mounting region 506 (depicted as a tongue) may guide the groove 526 of the arm 507. However, other sliding mechanisms may be employed that facilitate the sliding of the arm 507 as to vary the distance between a leg mounting region 508 and a breach 514 or the surface terminus (not shown). Alternative sliding mechanisms may comprise, for example, sliding box joints, sliding dovetails, rails, slides, guides, combinations thereof, and/or the like. Furthermore, the arm mounting region 506 may not be limited to the positive or male part of a guide but may comprise a negative space adhered to the plate 501. For example, the negative space of groove 526 may be employed with a rail, slide or similar mechanism. The arm mounting region 506 may be carved directly into the plate 501 or the arm 507. The leg mounting region 508 may be disposed at an end of the arm 507. The leg mounting region 508 may extend beyond the breach 514 if a substantially perpendicular support 513A and/or 513B is employed.

Figure 6:
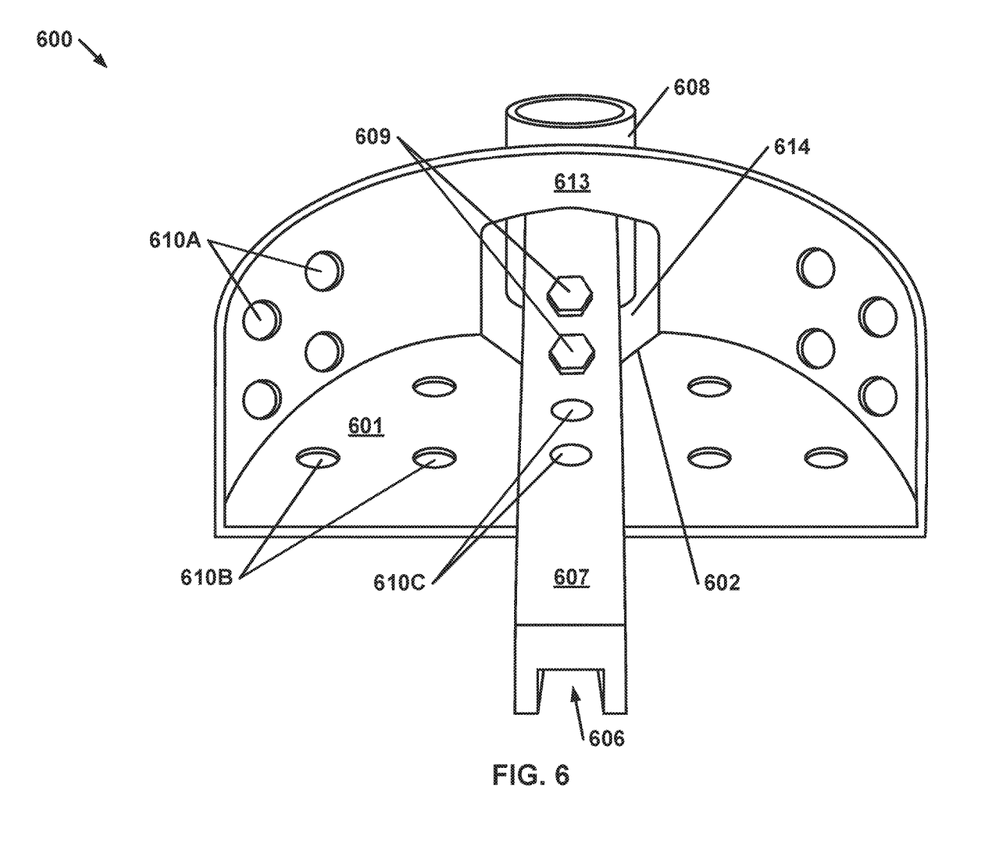
FIG. 6 is an illustration of an example adjustable bracket as per an aspect of an embodiment of the present disclosure.

FIG. 6 illustrates an example embodiment 600 of the present disclosure employing a curved plate 601. This illustrated embodiment may sit against an inner angle of a joint (not shown). The embodiment 600 may require less material to manufacture than the triangular plate shown in FIG. 4. The embodiment 600 may employ similar elements to the embodiment illustrated in FIG. 4. The embodiment 600 may adhere to a table surface (not shown) and/or an apron (not shown) by using fasteners 609 through voids 610A and/or 610B. An arm 607 may be attached to a plate 601 employing an arm mounting region 606 and may extend beyond a plate edge 602. If a perpendicular support 613 is employed, it may require a breach 614 for a leg mounting region 608 to extend beyond the perpendicular support 613. Mechanical adhesion may use voids 610C to hold the arm 607 against the arm mounting region 606 using the fasteners 609. Other locking mechanisms may lock the arm in place. Examples of these locking mechanisms include mechanical adhesion, a rackets and pinions, gravity induced frictional forces, combinations thereof, and/or the like.

FIG. 7 illustrates an example bracket 700 mounted to the corner of a table. The Bracket 700 may be adhered either to a surface 704 and/or to apron(s) 717A and/or 717B (shown in dashes), without providing any structural support to the corner formed. However, such a configuration may employ an additional breach 714 in either the surface 704 or in the apron(s) 717A and/or 717B, so that the arm 707 may be extended beyond an internal angle formed by the aprons 717A and 717B. A similar configuration may be employed with a substantially flat surface vertically supported above the ground. The arm 707 may be affixed to a leg mounting region 708, which may be held passed the internal angle of a corner 719, a breach 714 in a substantially perpendicular supports 713A and/or 713B, and/or a plate edge 702. The arm 707 may extend beyond an angle formed by the perpendicular supports 713A and/or 713B. A leg 715 (shown in dashes) may be mounted to the leg mounting region 708. Voids 710A and/or 710B may be employed to mechanically adhere the bracket 700 to the aprons 717A and/or 717B and/or the surface 704, respectively. Fasteners 709 may be employed through voids 710C to mechanically lock the position of the arm 707.

Figure 8A:
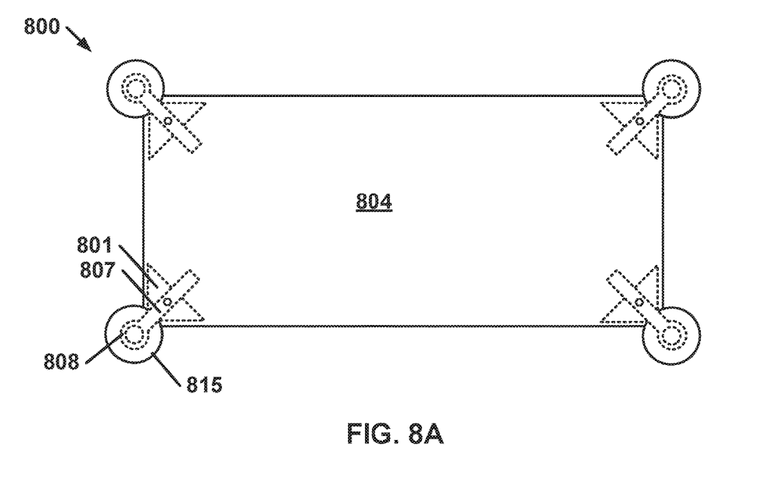
FIG. 8A is a top view illustration of a table top with legs attached employing a bracket as per an aspect of an embodiment of the present disclosure.
Figure 8B:
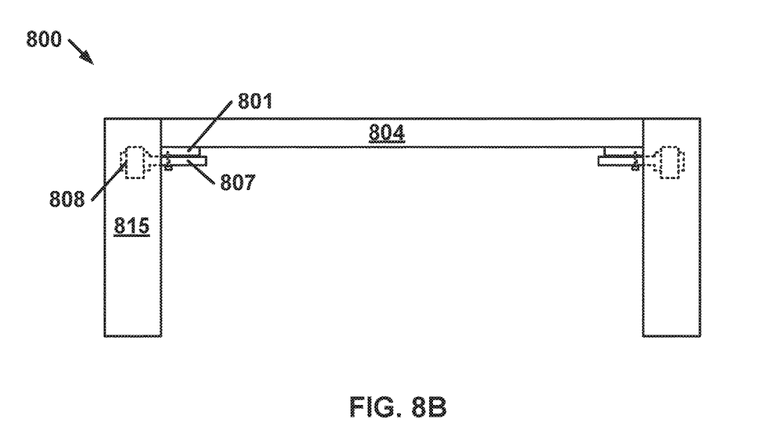
FIG. 8B is a side view illustration of a table top with legs attached employing a bracket as per an aspect of an embodiment of the present disclosure.

FIG. 8A and FIG. 8B illustrate an example table 800 with each leg 815 mounted employing a bracket as per an aspect of an embodiment. A plate 801 holds an arm 807 in relation to a surface of a table 804. The leg 815 may be attached to a leg mounting region 808, holding the leg in a fixed position, relative to the table 804. Though this figure illustrates the bracket employed in the corner of a table, a person having ordinary skill in the art would recognize the potential use in other constructs which may hold a leg in a fixed relation to a substantially horizontal surface. Although FIG. 8 illustrates the leg 815 mounted partially external to the square of the table 804, alternative embodiments may mount the leg 815 external to the square of the table 804.

Figure 9A:
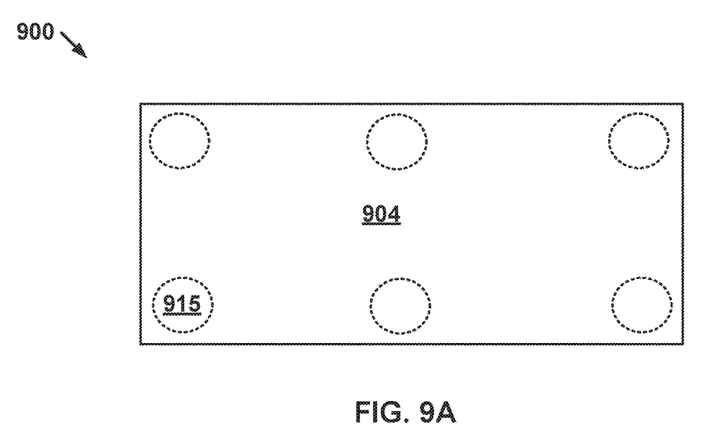
FIG. 9A is a top view illustration of a table top with legs attached as an example of a traditional table.
Figure 9B:
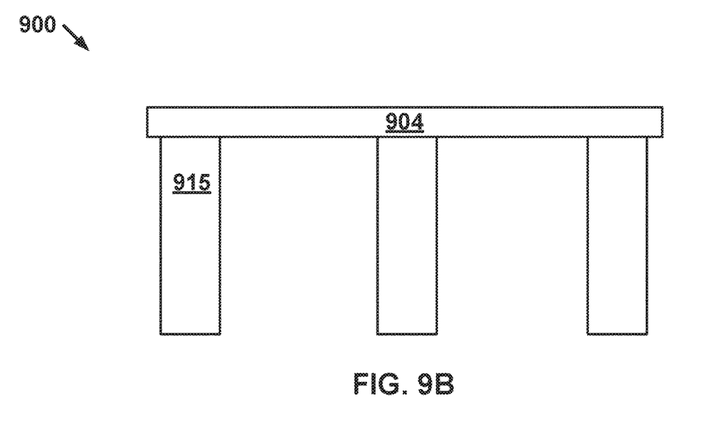
FIG. 9B is a side view illustration of a table top with legs attached as an example of a traditional table.

FIG. 9A and FIG. 9B illustrate a traditional table where the legs 915 sit under the table surface 904.

An embodiment of the present disclosure comprises a plate, an arm, and a mechanical arm fastener. The plate may comprise a plate edge, and one or more surface mounting regions. The one or more surface mounting regions may be structurally configured to affix the plate to a surface with the plate edge facing a surface terminus of the surface. The arm may comprise a leg mounting region. The mechanical arm fastener may be structurally configured to adjustably hold the arm to an arm mounting region with the leg mounting region extending beyond the plate edge.

An embodiment of the plate may comprise one or more various materials such as, for example: metal, plastic, wood, ceramic, a combination thereof, and/or the like. According to an embodiment, the plate may be processed (formed, machined, cast, and/or the like) into a resultant shape. Other processes may be employed by one or ordinary skill in the art to create the plate, such as, for example, welding, joining, and/or the like.

Forming is a technique of fashioning parts and objects through a process such as, for example: mechanical deformation, tensile forming, shearing, and/or the like. Mechanical deformation may comprise reshaping material. According to an embodiment, reshaping material may attempt to reshape material without adding or removing material. Tensile forming may comprise stretching a material, expanding a material, recessing a material, and/or the like. Shearing may comprise applying a shearing load to a material to alter its shape. Machining may comprise a process in which a material may be cut into a desired final shape and size by, for example, a controlled material-removal process. The material-removal process may be employ tool(s) such as, but not limited to, mills, lathes, drills, and/or the like. Milling machines may employ rotary cutters to remove material. Lathes may rotate a material why portions of the material may be removed by processes such as, but not limited to: cutting, sanding, knurling, drilling, deforming, and/or the like. Drilling machines may remove portions of material by, for example, turning, boring, shaping, and/or the like. Casting may comprise inserting a flexible material (for example, a liquid, a plastic, etc.) into a mold. A mold may comprise a hollow cavity in a desired shape. The inserted material may, according to some embodiments, solidify in the mold. Casting may comprise, for example: molding, sand casting, slip casting, and/or the like. Molding may comprise a process of manufacturing by shaping liquid or pliable raw material using a rigid frame called a mold. Sand casting may comprise a molding process characterized by using sand as the mold material. Slip casting may comprise a process of allowing material layers to form on the walls of a mold. Molds may be made out of various materials such as, for example, plastic, sand, plaster, metal, wood, rubber, and/or the like.

An embodiment of the plate may comprise a breach. The breach in the plate may comprise a shape configured to allow the arm mounting region to extend and/or adjust through the plate, beyond a plate edge and/or a surface of the table.

An embodiment of the plate may comprise a plate edge. The plate edge may comprise different dimensions to allow the plate to align with a surface terminus of the table. The plate edge may be flat, curved, chamfered, and/or the like.

An embodiment of the plate may comprise one or more surface mounting regions. The one or more surface mounting regions may be structurally configured to affix the plate to a surface with a plate edge facing a surface terminus of a table surface. The table surface may comprise one or more various materials such as, for example: metal, plastic, wood, ceramic, a combination thereof, and/or the like. The table surface may comprise the bottom face of a table top, the inner edge of an apron structurally affixed to the table surface, and/or the like. The surface terminus may be straight, curved, angled, jagged, and/or a combination thereof, and/or the like.

An embodiment of the surface mounting region may comprise a void. The void may take various shapes such as, for example: solid holes, tapered voids, threaded holes, and/or any combination of the like. An embodiment of the void may be structurally configured to support the head of a mechanical plate fastener attached to the surface through at least one void. The mechanical plate fastener may comprise various mechanical fastening devices such as, for example: a screw, a bolt, a nail, a dowel, a cord, a cable, a pin, and/or any combination of the like. A combination of mechanical plate fasteners may comprise, for example, a bolt supporting the plate, held in place by a pin structurally configured to run through a void in the bolt. One skilled in the art may employ yet other fasteners and/or fastening technique. For example, other fasteners and/or fastening techniques may comprise cam action quick release fasteners, glue, clamps, welds, and/or any combination of the like. These embodiments may not require voids in the plate. The mechanical plate fastener may comprise one or more various materials such as, for example: metal, plastic, wood, ceramic, a combination thereof, and/or the like.

An embodiment of the present disclosure may comprise an arm. According to an embodiment, the arm may be processed (formed, machined, cast, and/or the like) into a resultant shape. Other processes may be employed by one or ordinary skill in the art to create a plate, such as, for example, welding, joining, and/or the like. The arm may comprise one or more slots. The slots may comprise various types of sliding mounts such as, for example: a tongue in groove, a cam action quick release slot, a dovetail, any combination thereof, and/or the like.

An embodiment of the arm may comprise a leg mounting region. The leg mounting region may comprise a threaded cylinder. The threaded cylinder may comprise an internal screw thread, an external screw thread, a hollow cylinder, and/or any combination of the like. In an embodiment of the leg mounting region it may be structurally configured to a leg. The leg may comprise various materials such as, for example: metal, wood, ceramic, plastic, a combination thereof, and/or the like. The leg may be configured in various shapes such as, for example: a cylinder, a prism, a cone, a trapezoidal cone, and/or any combination of the like. The leg may be structurally configured to the leg mounting region and/or the arm by a mechanical leg fastener. The mechanical leg fastener may comprise various mechanical fastening devices such as, for example: a screw, a bolt, a nail, a dowel, a cord, a cable, a pin, and/or any combination of the like. A combination of the mechanical leg fasteners may comprise, for example, a bolt supporting the plate held in place by a pin structurally configured to run through a void in the bolt. One skilled in the art may employ yet other fasteners and/or fastening vehicles. For example, other fasteners and/or vehicles may comprise cam action quick release fasteners, glue, clamps, welds, and/or any combination of the like. These embodiments may not require voids in the plate. The mechanical leg fastener may comprise one or more various materials such as, for example: metal, plastic, wood, ceramic, a combination thereof, and/or the like.

An embodiment of the present disclosure may allow the leg mounted to the table surface to be interchangeable. The leg may differ in its height, size, width, depth, diameter, ornamental design, and/or any combination of the like. An embodiment of the present disclosure may structurally configure the top of the leg so that it is flush with the table surface, below the table surface, above the table surface, and/or any combination of the like. An embodiment of the present disclosure may structurally configure the leg so that it is perpendicular to the table surface (90 degrees) or at another angle such that the surface may be supported by the leg such as, for example, 75 degrees, 45 degrees, or 30 degrees. Different legs may be mounted at different angles.

An embodiment of the present disclosure structurally configures the arm to an arm mounting region using a mechanical arm fastener. The arm mounting region may comprise an area of the plate, the surface, and/or any combination of the like. An embodiment of the arm mounting region may further comprise an arm guide. The arm guide may comprise a tongue in groove component, a cam action quick release component, a dovetail component, any combination thereof, and/or the like.

A mechanical arm fastener may comprise various fastening devices such as, for example: a screw, a bolt, a nail, a dowel, a cord, a cable, a pin, and/or any combination of the like. A combination of mechanical arm fasteners may comprise, for example, a bolt supporting the plate held in place by a pin structurally configured to run through a void in the bolt. One skilled in the art may employ yet other fasteners and/or fastening vehicles. For example, other fasteners and/or vehicles may comprise cam action quick release fasteners, glue, clamps, welds, and/or any combination of the like. These embodiments may not require voids in a plate. The mechanical arm fastener may comprise one or more various materials such as, for example: metal, plastic, wood, ceramic, a combination thereof, and/or the like.

An embodiment of the present disclosure may comprise one or more perpendicular supports. The perpendicular support may comprise a wall, a miter joint, a curve, and/or any combination of the like. The perpendicular supports may be structurally configured to meet at an angle, to have a gap, to meet at a miter joint, and/or any combination of the like. A perpendicular support may be structurally configured to sit perpendicular to the plate and flush with the apron of the table surface. Like a plate, the perpendicular supports may comprise a breach. The breach in the perpendicular supports may comprise a shape configured to allow the arm, and/or the arm mounting region to pass, extend, and/or adjust through the plate, beyond the plate edge and/or surface of the table.

Figure 10:
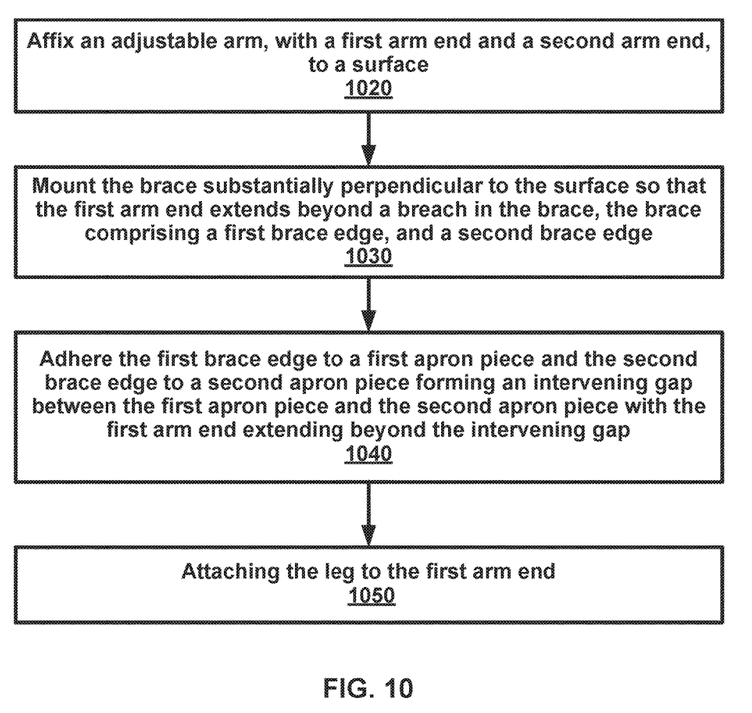
FIG. 10 is a flow diagram as per an example of an embodiment the disclosure.

FIG. 10 is flow diagram as per an example of an embodiment of the disclosure. At 1020, an adjustable arm may be affixed to a surface. The adjustable arm may comprise a first arm end. The adjustable arm may comprise a second arm end. At 1030, a brace may be mounted substantially perpendicular to the surface so that the first arm end extends beyond a breach. The brace may comprise a first brace edge. The brace may comprise a second brace edge. At 1040, the first brace edge may adhere to a first apron piece. The second brace edge may adhere to a second apron piece. The first and second brace edges may adhere to the first and second apron pieces, respectively, and may form an intervening gap between the first apron piece and the second apron piece. The first arm end may extend beyond the intervening gap. At 1050, a leg may be attached to the first arm end.

Descriptions of embodiments of the invention in the present application are provided by way of example and are not intended to limit the scope of the invention. It will be apparent to persons skilled in the relevant art(s) that various changes in form and detail can be made therein without departing from the spirit and scope. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

In addition, the figures, which highlight the functionality and advantages of the present invention, are presented for example purposes only. The configuration(s) of the embodiments are sufficiently flexible and configurable, such that they may be utilized in ways other than that shown in the accompanying figures and descriptions. For example, the steps listed in any flowchart may be re-ordered or only optionally used in some embodiments.

In the description and claims of the present application, each of the verbs, "comprise" "include" and "have," and conjugates thereof, are used to indicate that the object or objects of the verb are not necessarily a complete listing of components, elements or parts of the subject or subjects of the verb. In the disclosure, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

In this specification, "a," and "an," and similar phrases are to be interpreted as "at least one" and "one or more." Similarly, any term that ends with the suffix "(s)" is to be interpreted as "at least one" or "one or more." References to "the," "said," and similar phrases should be interpreted as "the at least one," "said at least one," etc. References to "an" embodiment in this disclosure are not necessarily to the same embodiment.

It is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

What is claimed is:

1. An apparatus comprising:
    a plate comprising:
        a plate edge;
        one or more surface mounting regions configured to affix the plate to a surface, by a mechanical plate fastener through at least one void, with the plate edge facing a surface terminus of the surface; and
        a breach;
    an arm comprising a leg mounting region, the leg mounting region comprising a threaded cylinder configured to receive a threaded portion of a leg; and
    an arm fastener configured to adjustably hold the arm to an arm mounting region with the arm extending through the breach and the leg mounting region extending beyond the plate edge.

2. An apparatus comprising:
    a plate comprising:
        a plate edge;
        an arm mounting region; and
        one or more surface mounting regions configured to affix the plate to a surface with the plate edge facing a surface terminus of the surface;
    an arm comprising a leg mounting region;
    an arm fastener configured to adjustably hold the arm to the arm mounting region with the leg mounting region extending beyond the plate edge; and
    wherein the leg mounting region comprises a threaded cylinder.

3. The apparatus as in claim 2, wherein the plate is formed.

4. The apparatus as in claim 2, wherein the plate further comprises a breach.

5. The apparatus as in claim 4, wherein the arm extends beyond the plate edge through the breach.

6. The apparatus as in claim 2, wherein the plate is affixed to the surface.

7. The apparatus as in claim 2, wherein the surface comprises an inner edge of an apron.

8. The apparatus as in claim 2, wherein the one or more surface mounting regions comprises at least one void.

9. The apparatus as in claim 8, wherein the at least one void is configured to support a head of a mechanical plate fastener coupled to the surface through the at least one void.

10. The apparatus as in claim 9, wherein the mechanical plate fastener comprises at least one of:
    a screw;
    a bolt;
    a nail;
    a dowel;
    a cord;
    a cable; and
    a pin.

11. The apparatus as in claim 2, wherein the arm mounting region further comprises an arm guide.

12. The apparatus as in claim 2, wherein the arm comprises at least one slot.

13. The apparatus according to claim 2, wherein the leg mounting region comprises a mechanical leg fastener.

14. The apparatus according to claim 2, wherein the arm fastener comprises a mechanical arm fastener.

15. The apparatus as in claim 14, wherein the mechanical arm fastener comprises at least one of:
    a screw;
    a bolt;
    a nail;
    a dowel;
    a cord;
    a cable; and
    a pin.

16. The apparatus according to claim 14, wherein the mechanical arm fastener comprises a structure that holds the arm to the arm mounting region employing a combination of gravity and friction.

17. The apparatus according to claim 2, further comprising at least one support member substantially perpendicularly disposed to the plate.

18. The apparatus according to claim 2, further comprising a breach in the at least one support member positioned for the arm to pass.

19. An apparatus comprising:
    a plate comprising:
        a plate edge;
        an arm mounting region; and
        one or more surface mounting regions configured to affix the plate to a surface with the plate edge facing a surface terminus of the surface;
    an arm comprising a leg mounting region;
    an arm fastener configured to adjustably hold the arm to the arm mounting region with the leg mounting region extending beyond the plate edge; and
    a skirt disposed along at least part of the plate edge, wherein the skirt comprises a breach positioned to pass the arm through the skirt.

* * * * *